US010643209B2

(12) United States Patent
Cohen et al.

(10) Patent No.: US 10,643,209 B2
(45) Date of Patent: May 5, 2020

(54) MOBILE APPLICATION DATA IDENTIFICATION METHOD AND APPARATUS

(71) Applicant: Flash Seats, LLC, Cleveland, OH (US)

(72) Inventors: Benjamin Charles Cohen, Cedar Park, TX (US); Andrew Michael Rosenbaum, Mercer Island, WA (US)

(73) Assignee: Flash Seats, LLC, Cleveland, OH (US)

( * ) Notice: Subject to any disclaimer, the term of this patent is extended or adjusted under 35 U.S.C. 154(b) by 939 days.

(21) Appl. No.: 14/820,145

(22) Filed: Aug. 6, 2015

(65) Prior Publication Data

US 2015/0347930 A1  Dec. 3, 2015

Related U.S. Application Data

(63) Continuation of application No. 13/340,200, filed on Dec. 29, 2011, now Pat. No. 9,147,191.

(60) Provisional application No. 61/432,673, filed on Jan. 14, 2011.

(51) Int. Cl.
*G06Q 20/40* (2012.01)
*G06Q 10/02* (2012.01)
*G06F 21/33* (2013.01)
*G07B 15/00* (2011.01)

(52) U.S. Cl.
CPC .......... *G06Q 20/401* (2013.01); *G06F 21/33* (2013.01); *G06Q 10/02* (2013.01); *G07B 15/00* (2013.01)

(58) Field of Classification Search
CPC .. G06F 21/335; G06F 21/6263; G06F 20/322; G06F 20/382; G06Q 30/0238; G06Q 30/0281; G06Q 30/0623; G06Q 10/1095; G06Q 20/3278; G06Q 30/0261;
(Continued)

(56) References Cited

U.S. PATENT DOCUMENTS 3,622,995 A  11/1971  Dikes et al.
5,999,095 A  12/1999  Earl et al.
6,496,809 B1  12/2002  Nakfoor
(Continued)

FOREIGN PATENT DOCUMENTS

CN  101025806 A  8/2007
CN  101299286 A  11/2008
(Continued)

OTHER PUBLICATIONS

Supplementary European Search Report for EP Application No. 11855858.4; dated Mar. 29, 2017; Flash Seats, LLC; 9 pages.
(Continued)

*Primary Examiner* — Johann Y Choo
(74) *Attorney, Agent, or Firm* — Knobbe, Martens, Olson & Bear LLP

(57) ABSTRACT

Applicant's Smartphone application provides ticket-holding patrons an alternative, digital means of verifying personal identification at entry to a venue or event. The Smartphone application periodically generates a unique QR code (barcode) that contains a unique identifier (i.e., mobile device ID) which prompts the venue/event entry system to recognize the patron. No barcode (serving as a ticket, or authentication/verification, or otherwise) is downloaded from the system server to the Smartphone/mobile device client in contrast to prior art systems.

30 Claims, 5 Drawing Sheets

(58) Field of Classification Search
CPC ... G06Q 20/12; G06Q 20/341; G06Q 30/0256
See application file for complete search history.

(56) References Cited

U.S. PATENT DOCUMENTS

| | | | |
|---|---|---|---|
| 6,685,093 B2 | 2/2004 | Challa et al. | |
| 6,842,741 B1 | 1/2005 | Fujimura | |
| 6,854,651 B2 | 2/2005 | Smith et al. | |
| 7,146,645 B1* | 12/2006 | Hellsten | G06F 8/61 726/33 |
| 7,693,744 B2 | 4/2010 | Forbes | |
| 8,346,580 B2 | 1/2013 | Nakfoor | |
| 9,147,191 B2 | 9/2015 | Cohen et al. | |
| 9,600,946 B1 | 3/2017 | Gerace et al. | |
| 9,697,650 B2 | 7/2017 | Nakfoor | |
| 10,109,125 B1 | 10/2018 | Gerace et al. | |
| 2001/0051915 A1* | 12/2001 | Ueno | G06Q 20/04 705/39 |
| 2003/0047613 A1 | 3/2003 | Funamoto et al. | |
| 2003/0110239 A1* | 6/2003 | Sugumoto | G06F 8/60 709/219 |
| 2003/0164400 A1* | 9/2003 | Boyd | G06Q 10/02 235/382 |
| 2003/0171960 A1 | 9/2003 | Skinner | |
| 2003/0182242 A1 | 9/2003 | Scott et al. | |
| 2004/0006497 A1 | 1/2004 | Nestor et al. | |
| 2004/0035925 A1 | 2/2004 | Wu et al. | |
| 2005/0021364 A1 | 1/2005 | Nakfoor | |
| 2008/0015983 A1 | 1/2008 | Spikes | |
| 2009/0198617 A1* | 8/2009 | Soghoian | G06Q 20/04 705/65 |
| 2009/0294539 A1 | 12/2009 | Kim | |
| 2009/0328207 A1* | 12/2009 | Patel | G06F 21/10 726/22 |
| 2010/0908249 | 4/2010 | Rosenblatt et al. | |
| 2010/0198626 A1 | 8/2010 | Cho et al. | |
| 2011/0105154 A1* | 5/2011 | Kim | H04W 4/00 455/458 |
| 2011/0117966 A1 | 5/2011 | Coppinger | |
| 2012/0091202 A1 | 4/2012 | Cohen et al. | |
| 2012/0185695 A1* | 7/2012 | Shah | H04L 9/0822 713/172 |
| 2012/0197797 A1* | 8/2012 | Grigg | G06Q 20/1085 705/43 |
| 2012/0214515 A1 | 8/2012 | Davis et al. | |
| 2013/0096961 A1 | 4/2013 | Owens | |
| 2013/0262163 A1 | 10/2013 | Bergdale et al. | |
| 2014/0039945 A1 | 2/2014 | Coady | |
| 2014/0100896 A1 | 4/2014 | Du | |
| 2014/0240350 A1 | 8/2014 | Chen et al. | |

FOREIGN PATENT DOCUMENTS

| | | |
|---|---|---|
| CN | 103415858 B | 3/2018 |
| DE | 100 34 275 A1 | 1/2002 |
| JP | 2001-256513 A | 9/2001 |
| JP | 2001-319186 A | 11/2001 |
| JP | 2002-109343 A | 4/2002 |
| JP | 2002-123730 A | 4/2002 |
| JP | 2002-344444 A | 11/2002 |
| JP | 2004-295650 A | 10/2004 |
| KR | 10-2003-0022630 A | 3/2003 |
| KR | 10-2004-0021165 A | 3/2004 |
| KR | 10-0592411 B1 | 6/2006 |
| WO | WO 94/10658 | 5/1994 |
| WO | 2012/096749 A2 | 7/2012 |

OTHER PUBLICATIONS

Notification of Transmittal of The International Search Report and The Written Opinion of the International Searching Authority, or the Declaration for International Application No. PCT/US2011/064807, dated Jul. 24, 2012, 9 pages.
International Preliminary Report on Patentability and Written Opinion of the International Searching Authority for PCT/US2011/064807, "Mobile Application Bar Code Indentification and System", dated Jul. 25, 2013.
Canadian Preliminary Review regarding Canadian Application No. 2577118, dated Jan. 25, 2019, 12 pages.

* cited by examiner

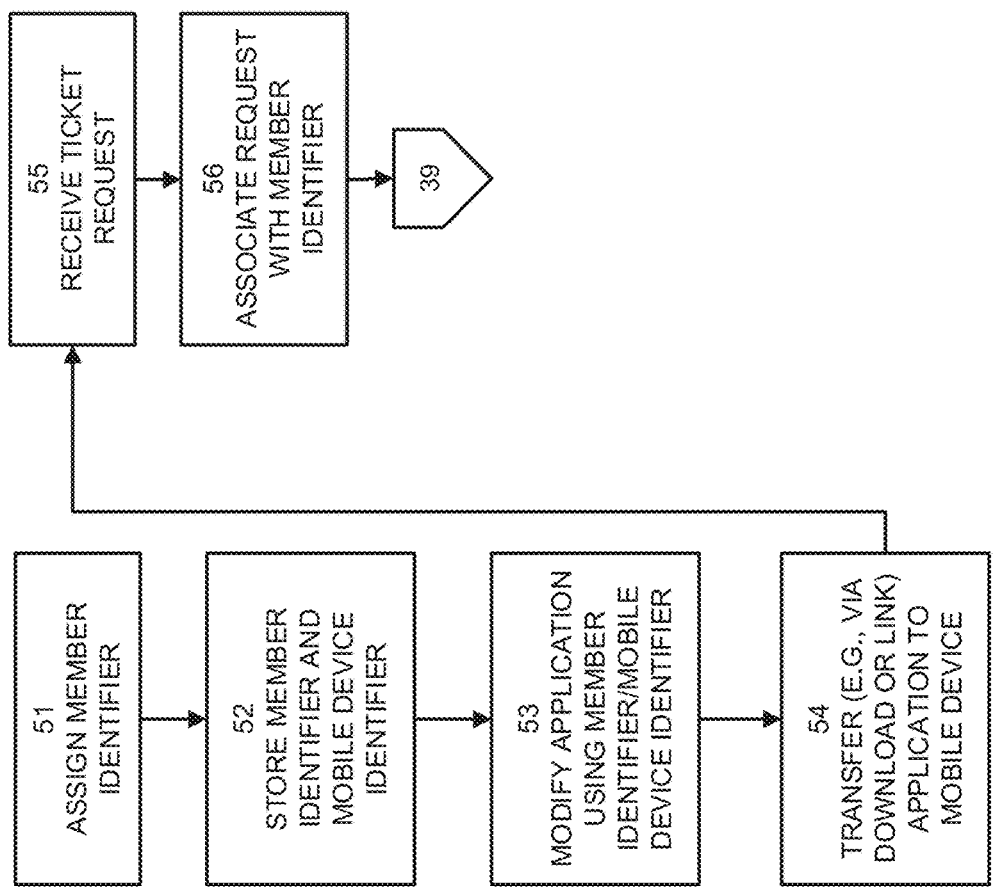

MOBILE APPLICATION DATA IDENTIFICATION METHOD AND APPARATUS

RELATED APPLICATION(S)

This application is a continuation of U.S. application Ser. No. 13/340,200, filed Dec. 29, 2011, which claims the benefit of U.S. Provisional Application No. 61/432,673 filed Jan. 14, 2011.

The entire teachings of the above application(s) are incorporated herein by reference.

BACKGROUND OF THE INVENTION

Common barcode technology is based on a laser emitting diode emitting a laser onto a subject barcode pattern and a reader reading the resulting reflected wave. This technology is unable to read barcodes displayed on PDA/mobile device screens or other liquid crystal displays. See Wu, et al., U.S. Patent Application Publication No. 2004/0035925, published Feb. 26, 2004 providing an image processing system for reading barcodes scanned from PDA/cell phone screens.

Yet other systems deliver barcodes to and render the downloaded bar codes on display units of mobile devices. Examples include:

U.S. Pat. No. 6,685,093 to Challa, et al for "System, Method and Apparatus for Communicating Information Between a Mobile Communications Device and a Bar Code Reader";

U.S. Pat. No. 7,693,744 to Forbes for "Optimised Messages Containing Barcode Information for Mobile Receiving Devices"; and U.S. Patent Application Publication No. 2003/0047613 by Funamoto, et al. for "Identification Barcode Assigning Method, Identity Verifying Method, Identification Barcode Assigning Device, Identity Verifying Device and Portable Terminal Device" which generates an identification barcode of a customer per store or event (i.e., serves as a concert/event ticket).

SUMMARY OF THE INVENTION

With the present invention, Applicant's provide improvements and advantages over the prior art.

The invention relates, in some aspects, to a computer-implemented method of electronically authenticating a person at a venue or event entry subsystem, comprising (a) assigning a member identifier to a user of a mobile device and a mobile device identifier to the mobile device of the user; (b) storing, in at least one identifier database, authentication data comprising at least one of the member identifier and the mobile device identifier, the identifier database being operatively coupled to the venue or event entry subsystem; (c) receiving data at a server, said data being locally generated on the mobile device by an application executed on the mobile device, the locally generated data being independent of venue and event data and comprising a time of generation and at least one of a generated member identifier and a generated mobile device identifier; (d) comparing, by the server, the authentication data with the locally generated data; and (e) sending a signal, based on the comparison, to the venue or event entry subsystem.

In some embodiments:

(1) the authentication data comprises the mobile device identifier, the locally generated data comprises the generated mobile device identifier, and an authenticating signal is sent if the mobile device identifier of the authentication data matches the generated mobile device identifier of the locally generated data; optionally wherein the authentication data further comprises the member identifier, the locally generated data further comprises the generated member identifier, and the authenticating signal is sent only if the member identifier of the authentication data also matches the generated member identifier of the locally generated data;

(2) the locally generated data by the application is in the form of (A) a two dimensional visual representation, such as a matrix or QR Code, (B) a bar code, or (C) a displayed set of characters;

(3) the application is downloaded to the mobile device, optionally from an application link;

(4) the method further comprises (i) receiving, by the server, a purchase request for a ticket or tickets from a buyer, the purchase request relating to at least one ticket; (ii) storing ticket information relating to the at least one ticket in at least one ticket information database, the ticket information database being operatively coupled to the venue or event entry subsystem; (iii) associating, by the server, the ticket information with the member identifier stored in the at least one identifier database; and (iv) allowing, if the server sends an authenticating signal, the user of the mobile device to obtain the at least one ticket or tickets; optionally wherein the ticket information includes a representation of (i) a quantity of the at least one ticket relating to the purchase request; (ii) a price of at least one of the at least one ticket relating to the purchase request; (iii) a time for an event associated with at least one of the at least one ticket relating to the purchase request; (iv) a venue for the event associated with at least one of the at least one ticket relating to the purchase request; and (v) ticket amount, ticket price, event time, and event venue or any combination of the aforementioned information;

(5) the application executed on the mobile device periodically generates data, the periodically generated data being the locally generated data received by the server;

(6) an authenticating signal is sent only if the time of generation of the received locally generated data is within a set of predefined time periods; or (7) the method further comprises calculating a time difference between the time of generation and a current time, and an authenticating signal is sent only if the calculated time difference is less than a set value.

The invention relates, in other aspects, to an electronic authentication apparatus electronically authenticating a person at a venue or event entry subsystem, comprising one or more servers, having a memory storing executable instructions that when executed by the one or more servers cause the one or more servers, to perform the operations of: (a) obtaining authentication data from at least one identifier database, the authentication data comprising at least one of a member identifier assigned to a user of a mobile device and a mobile device identifier assigned to the mobile device of the user, the identifier database being operatively coupled to the venue or event entry subsystem; (b) receiving data, said data being locally generated on the mobile device by an application executed on the mobile device, the locally generated data being independent of venue and event data and comprising a time of generation and at least one of a generated member identifier and a generated mobile device identifier; (c) comparing the authentication data with the locally generated data; and (d) sending a signal, based on the comparison, to the venue or event entry subsystem.

In some embodiments:

(1) the authentication data comprises the mobile device identifier and the locally generated data comprises the generated mobile device identifier, and the instructions when executed cause the one or more servers to send an authenticating signal if the mobile device identifier of the authentication data matches the generated mobile device identifier of the locally generated data, optionally wherein the authentication data further comprises the member identifier and the locally generated data further comprises the generated member identifier, and wherein the instructions when executed cause the one or more servers to send the authenticating signal only if the member identifier of the authentication data also matches the generated member identifier of the locally generated data;

(2) the data generated locally by the application is in the form of (i) a two dimensional visual representation, such as matrix or QR Code; (ii) a bar code; or (iii) a displayed set of characters;

(3) the application is downloaded to the mobile device, optionally from an application link;

(4) the instructions when executed further cause the one or more servers to perform the operations of (i) receiving a purchase request from a buyer, the purchase request relating to at least one ticket; (ii) storing ticket information relating to the at least one ticket in at least one ticket information database, the ticket information database being operatively coupled to the venue or event entry subsystem; (iii) associating the ticket information with the member identifier; and (iv) allowing, if the one or more servers send an authenticating signal, the user of the mobile device to obtain the at least one ticket; optionally wherein the ticket information includes a representation of (A) a quantity of the at least one ticket relating to the purchase request; (B) a price of at least one of the at least one ticket relating to the purchase request; (C) a time for an event associated with at least one of the at least one ticket relating to the purchase request; (D) a venue for the event associated with at least one of the at least one ticket relating to the purchase request; and (E) any combination of the aforementioned;

(5) the application executed on the mobile device periodically generates data, wherein the operation of receiving data locally generated by the application comprises receiving the periodically generated data; optionally wherein the operation of allowing the user of the mobile device to obtain the at least one ticket is performed only if the time of generation of the received locally generated data is within a set of predefined time periods; or (6) the instructions when executed further cause the one or more servers to perform the operation of calculating a time difference between the time of generation and a current time, wherein the one or more servers sends an authenticating signal only if the calculated time difference is less than a set value.

In embodiments, the present invention locally creates, i.e., generates anew, at the mobile device a barcode display uniquely identifying a person (the holder/bearer of the mobile device).

The mobile device may be any of a personal digital assistant (PDA), mobile phone, or other hand held digital processing and/or communications device. In a preferred embodiment, the mobile device is a so called smartphone by way of example and not limitation.

Applicant's smartphone application provides ticket-holding patrons an alternative, digital means of verifying personal identification at entry to a venue or event. The smartphone application periodically generates a unique QR code (barcode) that contains a unique identifier (i.e., mobile device ID) which prompts the venue/event entry system to recognize the patron. No barcode (serving as a ticket, or otherwise) is downloaded from the system server to the smartphone/mobile device client in contrast to prior art systems.

In a preferred embodiment, a computer-based method electronically authenticates a person (e.g., patron) at a venue or event entry, or otherwise. The person may be a patron, especially an account holding patron. To that end the method electronically verifies a person as an account holding patron/customer and electronically accesses patron account. The preferred method includes electronically storing in a database an indication of a mobile device user and an indication of a certain mobile device for that user.

The database is operatively coupled to venue or event entry subsystem. The subsystem may include turnstiles and/or gates, especially those that are electronically controlled and operated.

Next in the preferred embodiment, the method executes a code generating program on the certain mobile device. In turn, the mobile device locally creates and displays a bar code unique to the mobile device user. The bar code is not based on data solely driven by the venue or event such as, location name, address, event title, performance name, event session/showing, etc. In this way, the bar code is independent of venue data and event data.

At the venue or event entry subsystem, the mobile device user displays the locally created bar code on the certain mobile device. In response, the method: (a) electronically reads the bar code from the certain mobile device, (b) electronically decodes the bar code into a first indicator portion indicating mobile device user and a second indicator portion indicating mobile device, and (c) electronically accesses the database and compares the decoded first indicator portion to the database stored indication of the mobile device user and compares the decoded second indicator portion to the database stored indication of the certain mobile device. Where the comparing results in a match of the first indicator portion to the database stored indication of the mobile device user and a match of the second indicator portion to the database stored indication of the certain mobile device, the method automatically positively authenticates the mobile device user at the venue or event entry. This may include opening, unlocking or otherwise allowing the mobile device user to pass through the gate or turnstile of the venue or event entry subsystem.

In some embodiments, the database also stores user account information. For each user account, the database stores an indication of one mobile device of (associated with) the person (user) holding the account. Restated, per user account, an indication of the mobile device user (person holding the account) is associated with an indication of his certain mobile device in the database. Also in embodiments, the database per user account, stores ticket information of one or more tickets owned by the mobile device user (person who holds account). However, the venue or event entry subsystem authenticates identity of the mobile device user as an individual at the venue or event entry separate from and independent of authenticating him as a specific ticket holder (having tickets to a specific event).

The locally created bar code uniquely identifies the mobile device user that is the account holding person/patron/customer. The bar code is not based on data solely driven by the venue or event such as location name, location address, event title, performer name, event session or showing and the like. Instead the bar code is independent of event data and venue data.

After positively authenticating the mobile device user at the venue or event entry, the venue or event entry subsystem further (a) retrieves ticket information from the database, and (b) allows or otherwise enables the authenticated mobile device user to redeem one or more tickets and gain entry to the venue/event.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 and FIG. 5 are respectively flow diagrams of a venue entry sub system of the FIG. 3 embodiment and of a system of the FIG. 2 embodiment.

DETAILED DESCRIPTION OF THE INVENTION

A description of example embodiments of the invention follows.

The teachings of all patents, published applications and references cited herein are incorporated by reference in their entirety.

Figure 1:
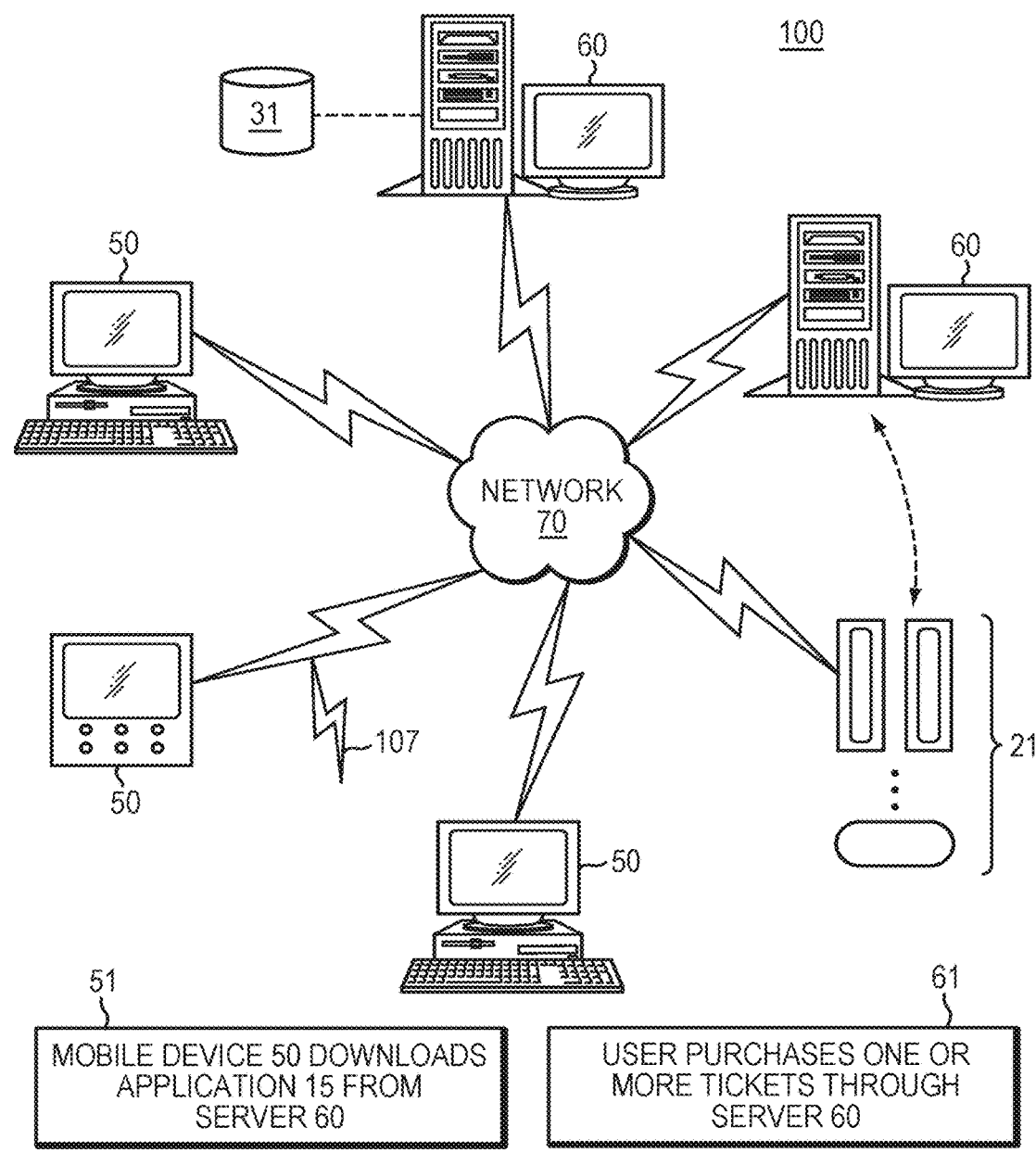
FIG. 1 is a schematic view of a computer network environment in which embodiments of the present invention are deployed.

FIG. 1 illustrates a computer network or similar digital processing environment in which the present invention may be implemented.

Client computer(s)/mobile devices 50 and server computer(s) 60 provide processing, storage, and input/output devices executing application programs and the like. Client computer(s)/devices 50 can also be linked through communications network 70 to other computing devices, including other client devices/processors 50 and server computer(s) 60. Similarly, other supplemental processing or reading devices 21 may be operatively linked to server computers 60 through communications network 70. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 2:
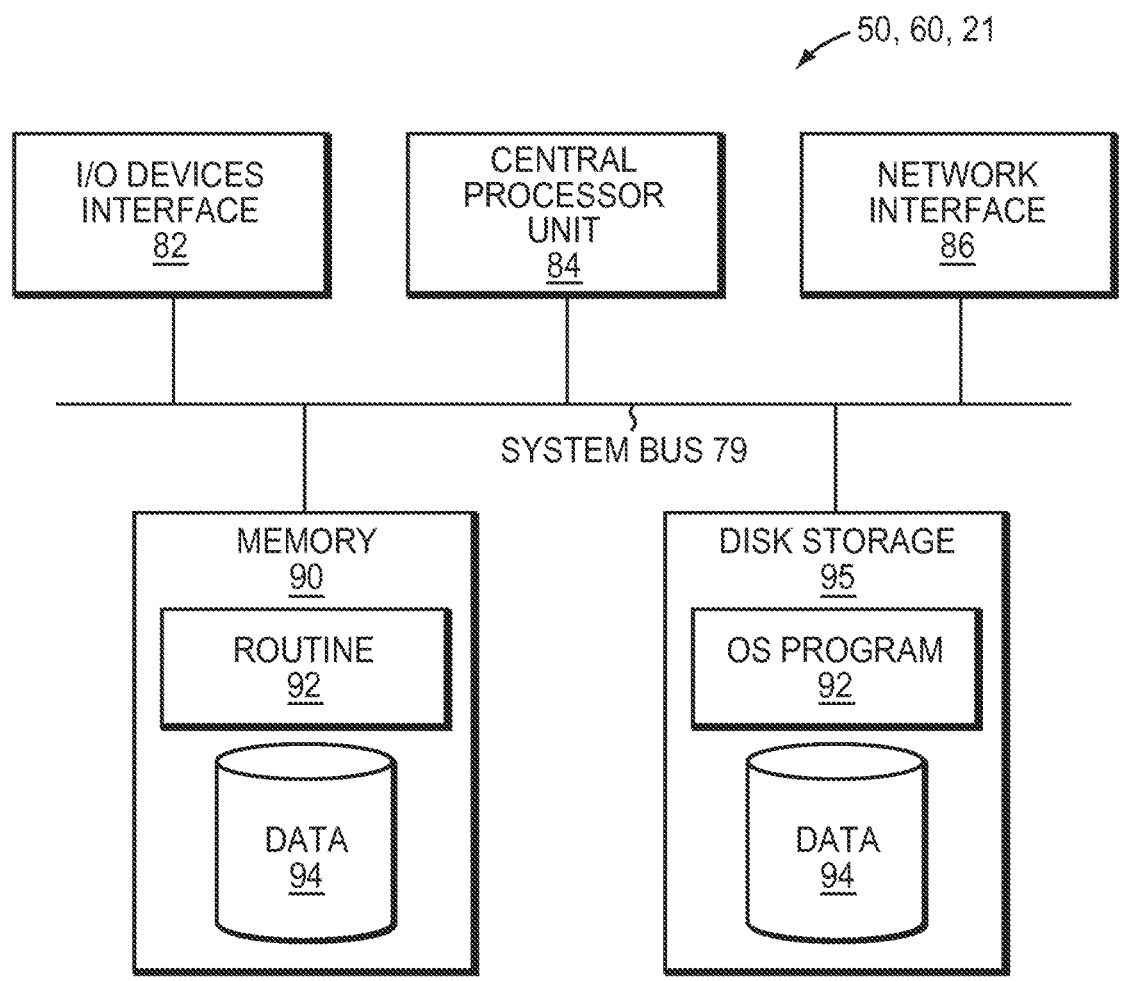
FIG. 2 is a block diagram of a computer node of the network of FIG. 1.

FIG. 2 is a diagram of the internal structure of a computer (e.g., client processor/device 50 or server computers 60 including supplemental devices 21) in the computer system 100 of FIG. 1. Each computer 50, 60, 21 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60, 21. Network interface 86 allows the computer to connect to various other devices attached to a network (e.g., network 70 of FIG. 1). Memory 90 provides volatile storage for computer software instructions 92 and data 94 used to implement an embodiment of the present invention (e.g., mobile device application 15 including QR code generation, client/server hashing, database management 31 and supporting code detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, non-transient storage, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" encompasses the foregoing transient signals, propagated signals, propagated medium, storage medium, non-transient medium and the like.

Figure 3:
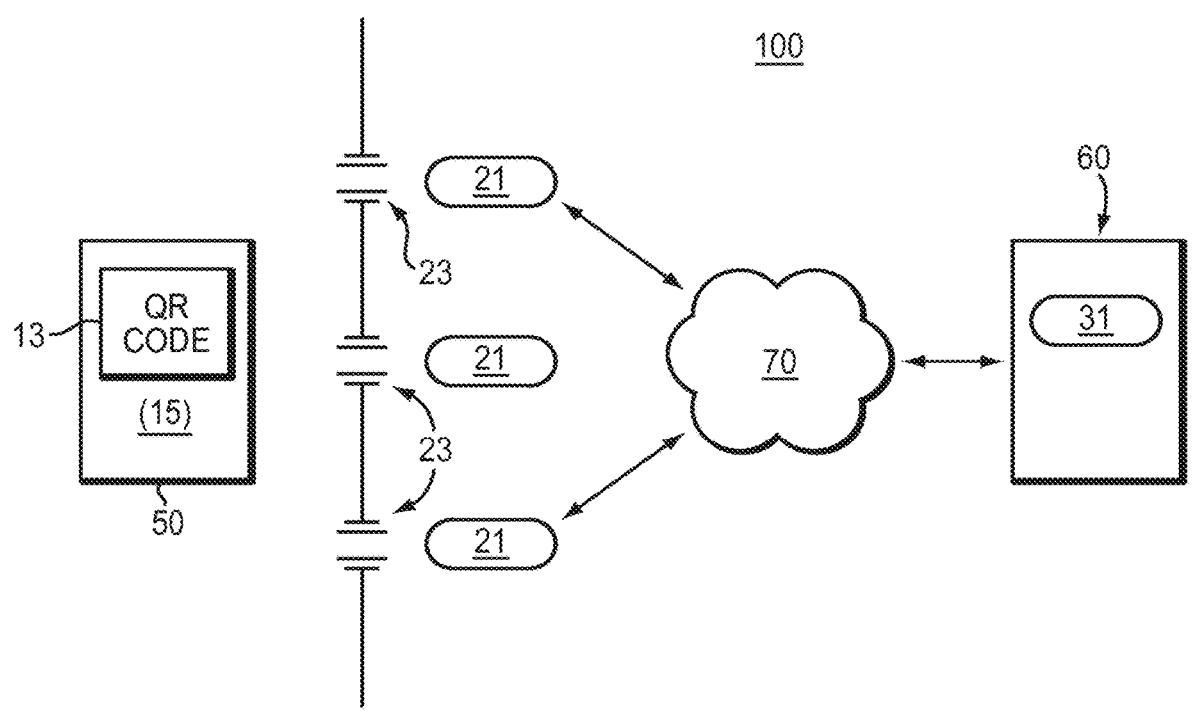
FIG. 3 is a schematic diagram of a preferred embodiment.

Turning to FIG. 3, a preferred smartphone 50 embodiment is illustrated. It is understood that other mobile devices 50 with similar applications program 15 are suitable.

Applicant's smartphone application 15 provides ticket-holding patrons an alternative, digital means of verifying personal identification at entry to events. The smartphone application 15 periodically generates (locally creates) a unique QR code 13 (in barcode format) that contains a unique identifier (i.e. Mobile ID) which prompts the system 100 to recognize the customer.

QR Code Content

The QR code 13 locally created and generated by the mobile application 15 contains a unique identifier (or iPhoneMD5 for example) consisting of the customer's system Member ID, Mobile ID and Coordinated Universal Time (UTC) date/time. Application 15 presents (outputs) the QR code 13 in barcode format.

At a venue entryway or other electronically controlled (automated) gate subsystem 23, a scanner/reading device 21 hashes the system Member ID, Mobile ID and UTC date/time information from the QR code (barcode) 13 in the following manner:

MemberID+MobileID+UTCdate/time+Md5Hash[MemberID+MobileID+UTCdate/time] where:

MemberID is a 64 bit integer using the first six digits from a customer's unique system Member ID (e.g. 999999), MobileID is a 64 bit integer generated by the system server 60 and communicated to mobile application 15 or otherwise input/defined in application 15. The Mobile ID is tied directly to the customer's mobile device 50 such that the customer can only have one system account tied to one mobile device (e.g. 9999990000000119). Server 60 stores in database 31, per customer, his system Member ID, his corresponding Mobile ID and ticket data of his purchased tickets.

UTC date/time is Universal Time and Date (year, month, day followed by hour, minutes, seconds e.g. 2010-08-05 14:56:33 encoded as 20100805145633). In one embodiment, the mobile application 15 locally generates a unique date/time code every 60 seconds. Other frequencies of date/time code generation are suitable.

Md5Hash is a one-way encryption of MemberID+MobileID+UTCdate/time.

System 100 Setup

Continuing with FIGS. 1 and 3, database 31 may be a relational or other configured datastore. It is understood that various system and network architectures of mobile devices 50 running application 15, server 60 having database 31 and cooperating venue entry subsystems 23, 21 are suitable. For example, a web server 60 with database 31 supports various and numerous venues, ticketing agents/distributors, brokers and so on across plural team sports, entertainment performers and the like, including for example but not limited to ticketing for games, concerts, presentations and live performances. Web server 60 with database 31 may be remote from venue servers 60 which are local to respective venues. The web server 60 and venue servers 60 (together with venue subsystem 23 and reader/scanners 21) may be operatively coupled for communication and processing as a WAN (wide area network), LAN (local area network), or other working computer network over a cable network, the Internet, an extranet or the like. Thus, web server 60 and venue servers 60 are generically referred to as server 60 herein.

In embodiments, server 60 maintains database 31. As new customers/patrons of participating venues become system 100 members, server 60 assigns respective unique system Member ID and records the same in database 31 (FIG. 5, block 51). As mentioned above, each customer may 'register' (i.e., indicate to system 100/server 60) one mobile device 50 to correspond to or be associated with the customer's system account (FIG. 5, block 52). Server 60 assigns and records in database 31 a unique Mobile ID for the customer (his account). The invention mobile application 15 is then configured or parameterized with the system Member ID (at least the first six digits in one embodiment) and the Mobile ID, and ultimately installed on the customer's subject mobile device 50 (FIG. 5, block 53). To accomplish this, server 60 may download-21 mobile application 15 so configured and parameterized to subject mobile device 50 through communications network 70 or otherwise (FIG. 5, block 54).

As a customer purchases tickets 61 to events (FIG. 5, block 55) at the various participating venues through server 60, system 100/server 60 records the ticket data accordingly in database 31 (i.e., tallied under the customer's system account) (FIG. 5, block 56). A "ticket" is a contractual right to attend a venue at a certain date and time or for a certain event. The contractual right may be to a certain seat or area in the venue or event. To the extent that an indication of the "ticket" is stored or held electronically, it is an "eticket" or "electronic ticket". Common or known technology is employed, and various techniques for displaying such tickets are suitable.

Venue Entry

Figure 4:
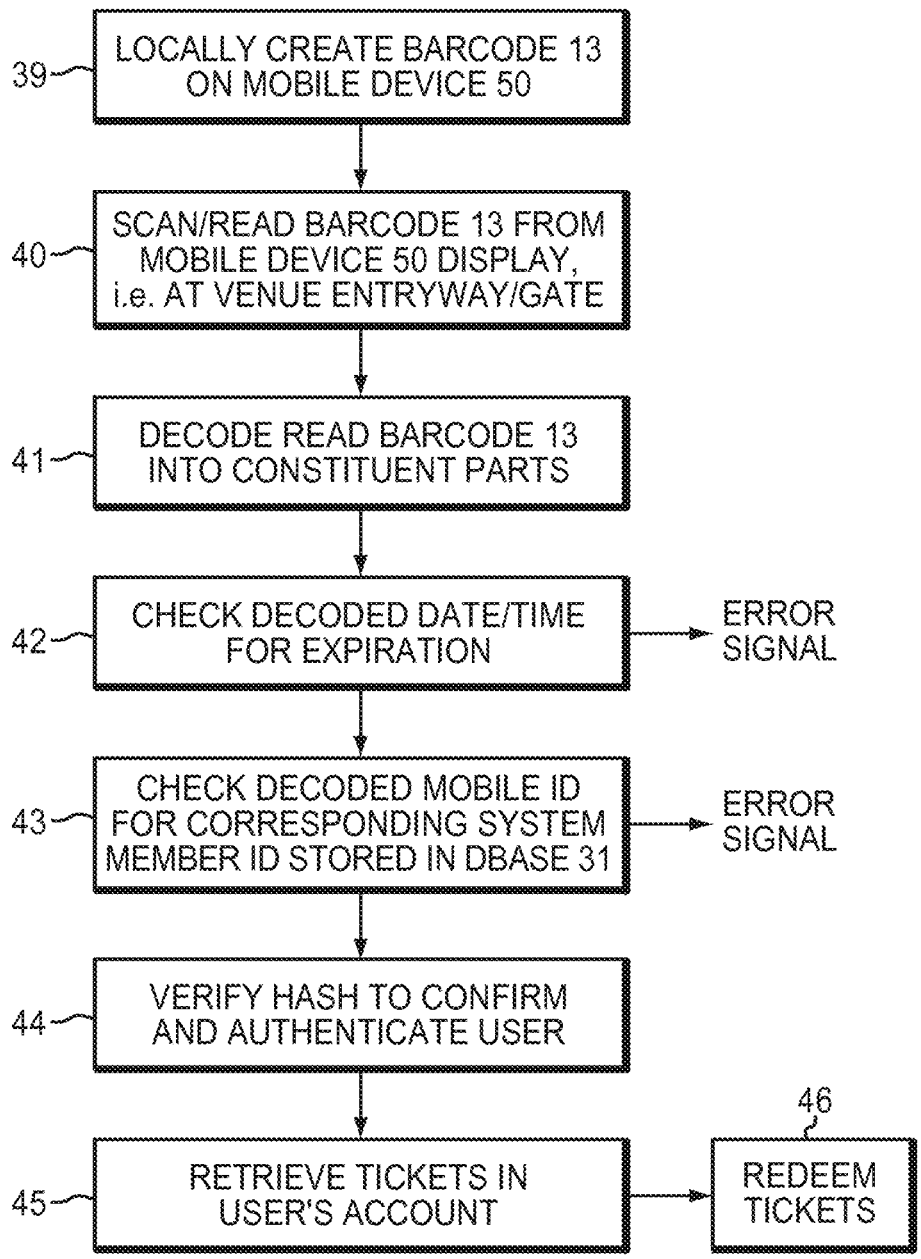

A mobile device 50 user runs/executes the invention application program 15 on the subject smartphone/mobile device 50. In turn, the executing application program 15 generates, or more precisely, locally creates the unique QR code (barcode) 13 and displays the same on the display screen/unit of the subject mobile device 50. Step 39 of FIG. 4 is illustrative. Note, server 60 of the system 100 is not responsible for initially creating this unique bar code 13; mobile device 50 running application 15 is.

At the venue gates or entry subsystem 23, a scanner/reading device 21 scans the QR code (barcode) 13 from the mobile device 50 display screen (Step 40, FIG. 4). Scanner/reading device 21 utilizes common or known barcode reading technology and is configured to perform the MD5Hash (or similar hash) as made clear below.

Once the QR code (barcode) 13 is scanned from the display screen of mobile device 50, the scanner/reading device 21 in electronic communication with server 60 and database 31 employs a series of checks in order to authenticate the user attempting to gain system account access and hence ticket and venue access. The progression of system 100 checks is as follows and diagrammed in FIG. 4.

1. Scanner/reader device 21 first decodes the contents of read barcode 13 (Step 41). This results in a Member ID candidate value, Mobile ID candidate value and UTC date/time candidate value.

2. Scanner/reader device 21 checks the UTC date/time candidate value to see if the read barcode 13 has expired or otherwise meets threshold date/time ranges as indicated by server 60 (Step 42). If the date/time has expired, scanner device 21 issues an error message as pertinent.

3. Scanner/reader device 21 in communication with server 60 uses the decoded results for MobileID candidate value to find System 100 stored corresponding Member ID in database 31. Known database look up and/or download techniques are used (Step 43). Server 60 and/or scanner device 21 issues any error message as pertinent if the Mobile ID candidate value does not properly index into database 31 or a corresponding Member ID is otherwise unable to be found in database 31.

4. If no errors have been produced up to this stage, then Step 44 verifies a hash of read barcode 13 by comparing (a) an MD5 (encrypted) hash of the Member ID candidate value+Mobile ID candidate value+UTC date/time candidate value to (b) MD5Hash encryption of the system Member ID stored in database 31+corresponding Mobile ID stored in database 31+UTC date/time candidate value. This effectively authenticates and verifies the subject mobile device 50 user.

It is understood that Step 44 processing may be performed by and at any combination of the server 60 and scanner/reader device 21. That is for server 60 processing Step 44, the server 60 (i) uploads from or otherwise communicates with the scanner/reader device 21 the read and decoded Member ID candidate value, the Mobile ID candidate value and the UTC date/time candidate value, (ii) utilizes the recently looked-up stored system Member ID and corresponding stored Mobile ID from database 31, (iii) executes the hash routine on each set of data values and compares the two hash results, and (iv) communicates (downloads) the results of the comparison to scanner/reader device 21. Where the comparison results in a match, then the user is authenticated (i.e., system verified).

Alternatively processing may be by or at the scanner/reader device 21 (i) requesting database 31 lookup of the stored Mobile ID corresponding to the system Member ID of Step 43 and obtaining (downloading) the results, and (ii) locally executing the hash routine on the two sets of data values (stored and candidate) and making the comparison of hash results. Where the comparison results in a match, the user is authenticated (i.e., system verified).

Other configurations of server 60 and/or scanner/reader 21 processing of Step 44 are suitable.

Where the comparison of hash results do not result in a match, then an error signal or message is provided by the scanner/reader 21.

5. Once Member ID, i.e., mobile device user authentication, is confirmed, scanner/reader device 21 and/or server 60 (step 45) check for tickets in the user's account as indicated in database 31. Common database look up using Member ID as an index is employed. The corresponding ticket data for this customer/mobile device user (via Member ID) may be downloaded from server 60 to venue gate subsystem 23 or scanner/reader devices 21.

6. Scanner/reader device 21 and/or venue gate subsystem 23 redeems tickets according to the downloaded ticket data (step 46).

Preferably, successful matching of the QR code 13 as read from the user's mobile device 50 and hashed by the scanner/reader device 21 to that of the stored data in database 31, as described above, may result in venue entry and prompts the scanner device 21 or venue entry subsystem 23 to print the customer's (mobile device 50 user's) seat locators and/or other ticket data. Unsuccessful matches prompt the scanner/reader device 21 or gate subsystem 23 to deny entry and refer the customer (mobile device user) to the venue box office.

Thus, the locally generated/created barcode 13 at mobile device 50 is not an "electronic ticket" to an event/venue (does not indicate venue and event) but rather is a digital means of verifying customer identity or authenticating a patron individual (bearer of the mobile device). After authentication of the mobile device user is completed, then system 100 considers (retrieves) the pertinent ticket/event data indicated in the user's system account uniquely tied to/associated with the subject mobile device 50.

Exemplary

In an example, non-limiting embodiment of system 100, web server 60 supports a website for making ticket transactions between patron/customers and ticket agents/distributors/resellers/brokers/venue box offices and the like, across multiple spectator/team sports and live performance-type events. An end user (would be patron/customer) logs on and registers with the website to become a member of system 100. During registration, the end user states his name, address, email address and a mobile phone number of his mobile device 50 for example. In turn, server 60 creates a user account, assigns a unique Member ID to the end user and assigns a unique Mobile ID for the user indicated mobile device 50. Also, Server 60 creates a record in data base 31 and stores or otherwise holds therein the newly created user account information (including pertinent user information), unique Member ID and unique Mobile ID corresponding to the end user.

Further server 60 configures mobile application 15 for use by the end user on his mobile device 50. In particular, server 60 sets the Mobile ID and Member ID parameters in application 15 and downloads 51 the configured/parameterized application 15 to end user mobile device 50. The downloading 51 may be accomplished by emailing an application link to the mobile device 50 or other installation techniques know in the art (FIG. 5, block 53). The end user mobile device 50 equipped with the application 15 is able to create as desired (on user command) bar code 13 uniquely identifying the end user as the account holding member of system 100, i.e., the registered member corresponding to the respective account.

As a registered account holding member of system 100, the end user has access to various ticket offerings and sales through website/web server 60. In one sample instance, say the end user purchases one or more tickets 61 to an event through the website using a credit card to satisfy the financial aspect of the ticketing transaction. Server 60 records pertinent ticket data in the database 31 record and account of the end user indicting for example, event date/time, venue, title/name of the event, seat/location and amount paid (FIG. 5, block 56). No paper form of the purchased ticket(s) needs to be mailed, printed from a computer screen display or otherwise provided to the end user.

On the event day/hour, the end user operates (i.e., executes) the application 15 on his mobile device 50 and creates bar code 13 on the display unit/screen of device 50. At the venue gate 23, a scanner/reader 21 scans and reads barcode 13 from end user mobile device 50. Scanner/reader 21 and/or venue server 60 in communication with web server 60 and database 31 process the read barcode 13 as described in Steps 40-44 of FIG. 4, and electronically authenticate the end user (i.e., verify his identity as an account holding, registered member of system 100 and not, at this stage, verifying him as a certain ticket holder to the subject event).

Once the end user is authenticated or verified as a system member (not, at this stage, as a subject event ticket holder) by system 100, server 60 and scanner/reader 21 access the end user's system account and obtain his ticket/eticket to the event. This may redeem the ticket/eticket and operate gate 23 (turnstiles and the like) to allow passage (entry) of the end user. Scanner/reader 21, gate 23 or networked printer at the venue may print a ticket receipt, seat information and the like for the end user.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of electronically authenticating a person at a venue executed by a venue system comprising an event entry subsystem including a reader or scanner, comprising:

assigning a member identifier to a user of a mobile device;

storing, in at least one identifier database, authentication data comprising the member identifier and a mobile device identifier, the mobile device identifier separate from a phone number of the mobile device of the user, the identifier database being operatively coupled to the venue system;

scanning or reading by the venue system scanner or reader locally generated entry data locally generated on the mobile device by an application executed on the mobile device, the locally generated entry data configured to grant entry to an event or venue,
the locally generated entry data comprising:
time of generation candidate data comprising a date and time corresponding to when the locally generated entry data was generated; and
a member identifier candidate and a mobile device identifier candidate,
the locally generated entry data not including an electronic ticket, location name, location address, event title, performer name, event session data, or event showing data;
comparing the locally generated entry data with data corresponding to the authentication data and with a time range associated with a current time;
using the comparison of the locally generated entry data with the data corresponding to the authentication data and with the time range associated with the current time, determining that the locally generated entry data corresponds to the authentication data and the time range associated with the current time;
at least partly in response to determining that the locally generated entry data corresponds to the authentication data and the time range associated with the current time,
locating a ticket record in a ticket information database associated with the user; and
enabling entry of the user to the venue.

2. The method of claim 1, wherein enabling entry of the user to the venue further comprises generating an authenticating signal.

3. The method of claim 2, wherein the locally generated entry data is encrypted, the method further comprising decrypting the locally generated entry data.

4. The method of claim 1, wherein the locally generated entry data is in the form of a two dimensional visual representation.

5. The method of claim 4, wherein the two dimensional visual representation is a matrix.

6. The method of claim 4, wherein the two dimensional visual representation is a QR Code.

7. The method of claim 1, wherein the locally generated entry data by the application is in the form of a bar code.

8. The method of claim 1, wherein the locally generated entry data is in the form of a displayed set of characters.

9. The method of claim 1, the method further comprising configuring the application with identification information of the user and identification information of the mobile device and enabling the configured application, with the identification information of the user and identification information of the mobile device, to be downloaded to the mobile device.

10. The method of claim 9, wherein the configured application is downloaded from an application link.

11. The method of claim 1, further comprising:
receiving a ticket request from a buyer, the ticket request relating to at least one ticket for a corresponding ticketed event;
storing ticket information relating to the at least one ticket in at least one ticket information database, the ticket information database being operatively coupled to the venue system;
associating the ticket information with the member identifier stored in the at least one identifier database; and
allowing based on the comparison, the user of the mobile device to obtain the at least one ticket.

12. The method of claim 11, wherein the ticket information includes a representation of (a) a quantity of the at least one ticket relating to the purchase request; (b) a time for an event associated with at least one of the at least one ticket relating to the purchase request; (c) a venue for the event associated with at least one of the at least one ticket relating to the purchase request; and (d) any combination of the aforementioned.

13. The method of claim 1, wherein the application executed on the mobile device periodically generates the locally generated entry data scanned or read by the venue system scanner or reader.

14. The method of claim 13, wherein an authenticating signal is sent based on the time of generation candidate data of the locally generated entry data is within a set of predefined time periods.

15. The method of claim 13, wherein comparing the locally generated entry data with data corresponding to the authentication data and with a time range associated with a current time further comprises calculating a time difference between the time of generation candidate data and a current time, comparing the time difference to a set value, and sending an authenticating signal based on the comparison.

16. An electronic authentication apparatus configured to authenticate users via mobile devices of the users, comprising:
an event entry subsystem including a reader or scanner;
a computer, having a processing device and a memory storing executable instructions that when executed by the computer cause the computer to perform the operations of:
obtaining authentication data from at least one identifier database, the authentication data comprising:
a member identifier assigned to a user of a mobile device, and
a mobile device identifier, the mobile device identifier separate from a phone number of the mobile device of the user,
the identifier database being operatively coupled to the venue or event entry subsystem;
scanning or reading by the event entry subsystem reader or scanner entry locally generated entry data that was locally generated on the mobile device by an application executed on the mobile device,
the locally generated entry data comprising
time of generation candidate data comprising a date and time corresponding to when the locally generated entry data was generated; and
a member identifier candidate and a mobile device identifier candidate,
the locally generated entry data not including an electronic ticket, location name, location address, event title, performer name, event session data, or event showing data;
comparing the authentication data and a time range associated with a current time with the locally generated entry data;
using the comparison of the authentication data and the time range associated with the current time with the locally generated entry data, determining that the locally generated entry data corresponds to the authentication data and the time range associated with the current time; and at least partly in response to determining that the locally generated entry data corresponds to the authentication data and the time range associated with the current time,
    locating a ticket record in a ticket information database associated with the user; and
    enabling entry of the user to the venue.

17. The apparatus of claim 16, wherein enabling entry of the user to the venue further comprises generating authenticating signal.

18. The apparatus of claim 17, wherein the locally generated entry data is encrypted, the apparatus further configured to decrypt the locally generated entry data.

19. The apparatus of claim 16, wherein the locally generated entry data generated locally by the application is in the form of a two dimensional visual representation.

20. The apparatus of claim 19, wherein the two dimensional visual representation is a matrix.

21. The apparatus of claim 19, wherein the two dimensional visual representation is a QR Code.

22. The apparatus of claim 16, wherein the locally generated entry data by the application is in the form of a bar code.

23. The apparatus of claim 16, wherein the locally generated entry data by the application is in the form of a displayed set of characters.

24. The apparatus of claim 16, wherein the apparatus is configured to configure the application with identification information of the user and identification information of the mobile device and to enable the configured application to be downloaded to the mobile device.

25. The apparatus of claim 24, wherein the configured application is downloaded from an application link.

26. The apparatus of claim 16, wherein the instructions when executed further cause the computer perform the operations of:
    receiving a ticket request from a buyer, the ticket request relating to at least one ticket;
    storing ticket information relating to the at least one ticket in at least one ticket information database, the at least one ticket information database being operatively coupled to the apparatus;
    associating the ticket information with the member identifier; and
    allowing, based on the comparison, the user of the mobile device to obtain the at least one ticket.

27. The apparatus of claim 26, wherein the ticket information includes a representation of (a) a quantity of the at least one ticket relating to the purchase request; (b) a time for an event associated with at least one of the at least one ticket relating to the purchase request; (c) a venue for the event associated with at least one of the at least one ticket relating to the purchase request; and (d) any combination of the aforementioned.

28. The apparatus of claim 16, wherein the application executed on the mobile device periodically generates the locally generated entry data, and wherein the periodically locally generated entry data is scanned or read by the scanner or reader.

29. The apparatus of claim 26, wherein the instructions when executed only allow the user of the mobile device to obtain the at least one ticket if the time of generation candidate data of the locally generated entry data is within a set of predefined time periods.

30. The apparatus of claim 26, wherein comparing the locally generated entry data with data corresponding to the authentication data and with a time range associated with a current time further comprises calculating a time difference between the time of generation candidate data and a current time, and sending an authenticating signal only if the calculated time difference is less than a set value.

* * * * *